Oct. 4, 1932.  C. F. A. EDDY  1,880,921
SWITCHING MECHANISM
Filed May 24, 1929   3 Sheets-Sheet 1
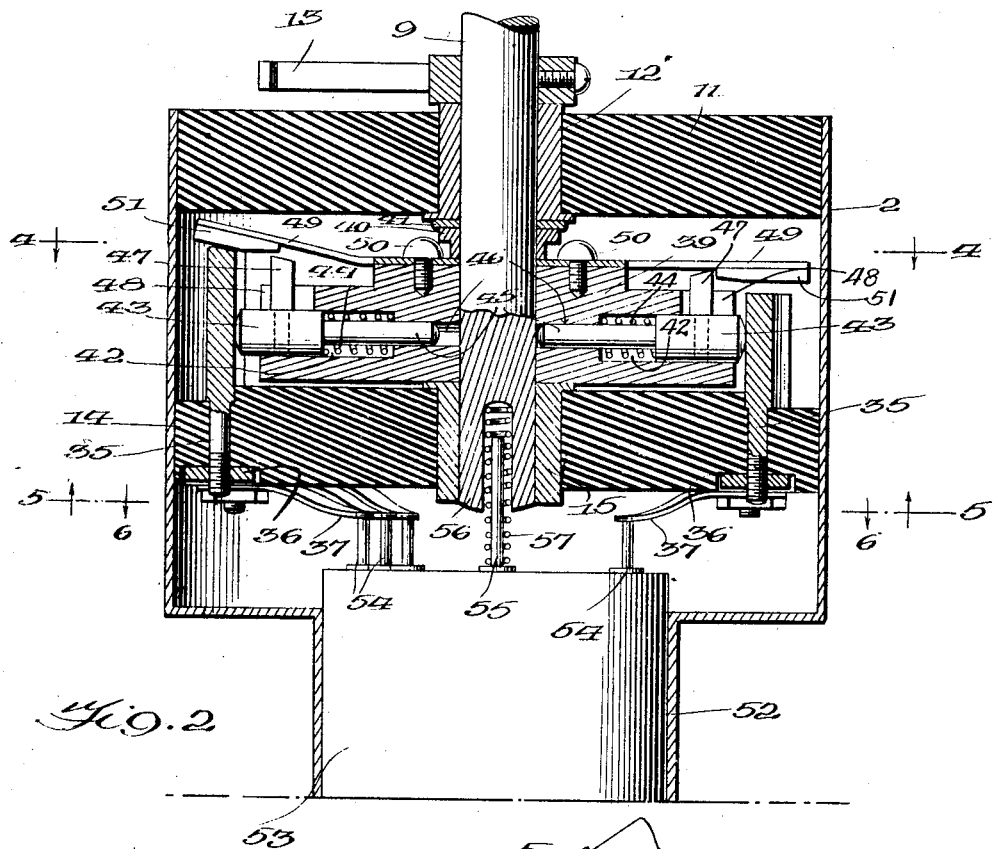

Oct. 4, 1932.   C. F. A. EDDY   1,880,921
SWITCHING MECHANISM
Filed May 24, 1929   3 Sheets-Sheet 2
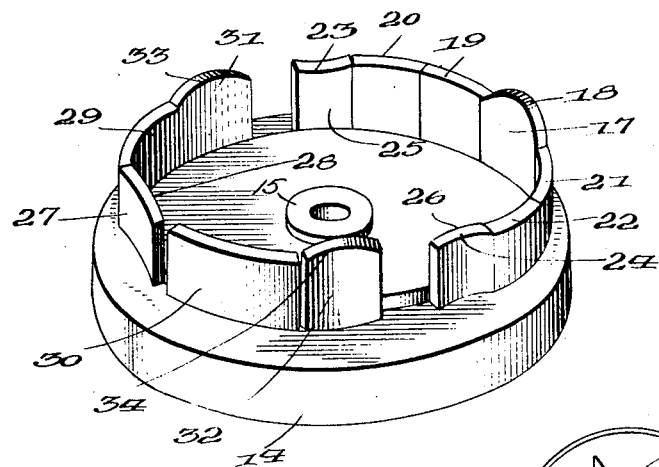
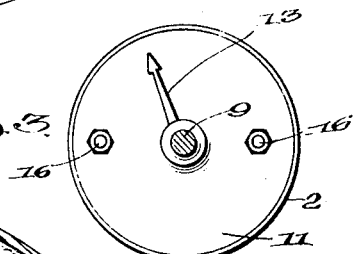
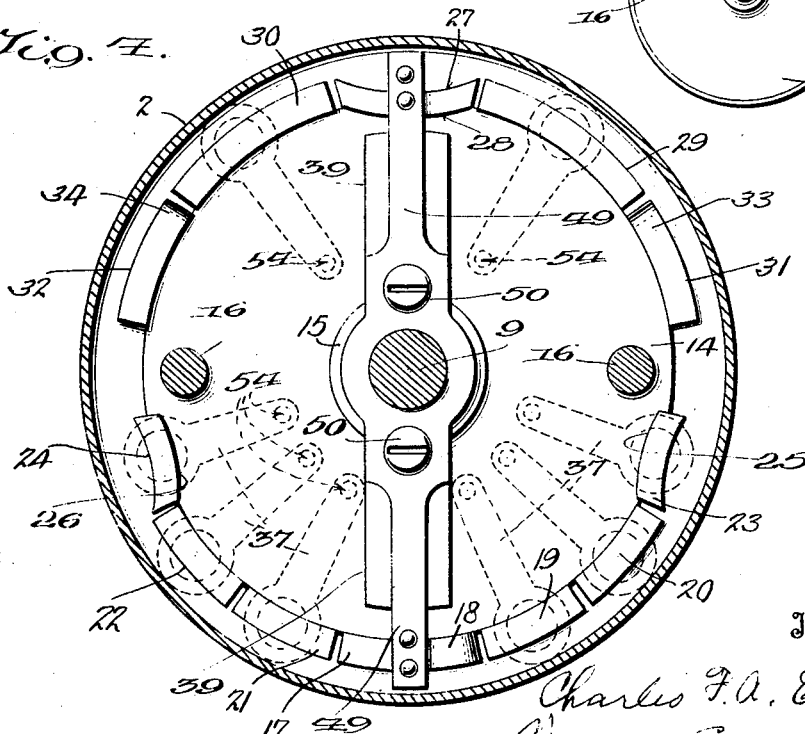

Oct. 4, 1932.  C. F. A. EDDY  1,880,921
SWITCHING MECHANISM
Filed May 24, 1929  3 Sheets-Sheet 3

Inventor
Charles F. A. Eddy
By Vernon E. Hodges
his Attorney

Patented Oct. 4, 1932

1,880,921

UNITED STATES PATENT OFFICE

CHARLES F. A. EDDY, OF NEW LONDON, CONNECTICUT

SWITCHING MECHANISM

Application filed May 24, 1929. Serial No. 365,669.

This invention relates to an improvement in switching mechanism.

The object of the present invention is to provide for the control of direction indicators for motor vehicles and to provide a switch mechanism for this purpose which will be not only effective to control both the front and rear direction indicators in simultaneous or proper actuation but also one that is of simplified character, so that it may be manufactured inexpensively and may be easily assembled for use.

In the accompanying drawings:

Fig. 1 is a side elevation showing a switch applied;

Fig. 2 is an enlarged sectional view through the switch;

Fig. 3 is an end view thereof;

Fig. 4 is a transverse section on the line 4—4 of Fig. 2;

Figure 5:
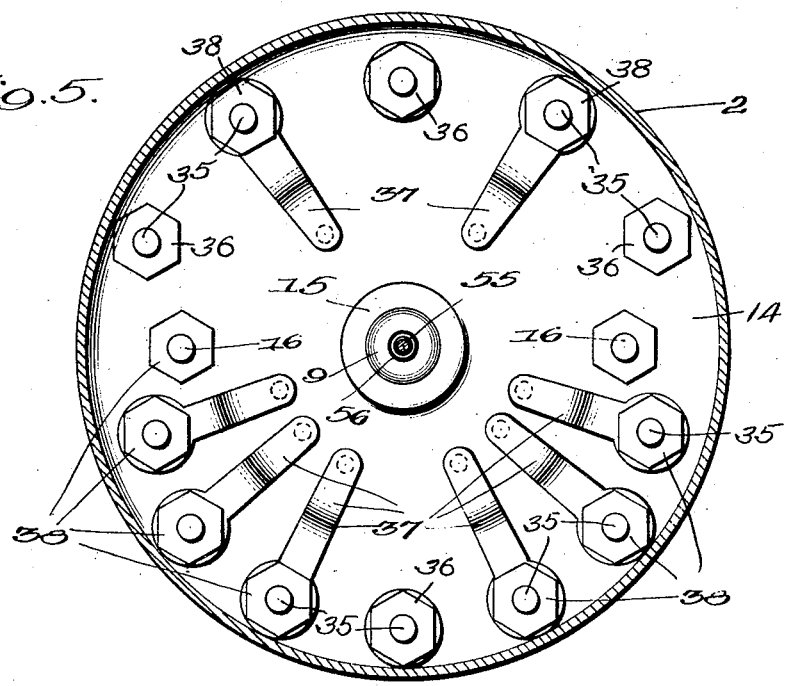
Figure 6:
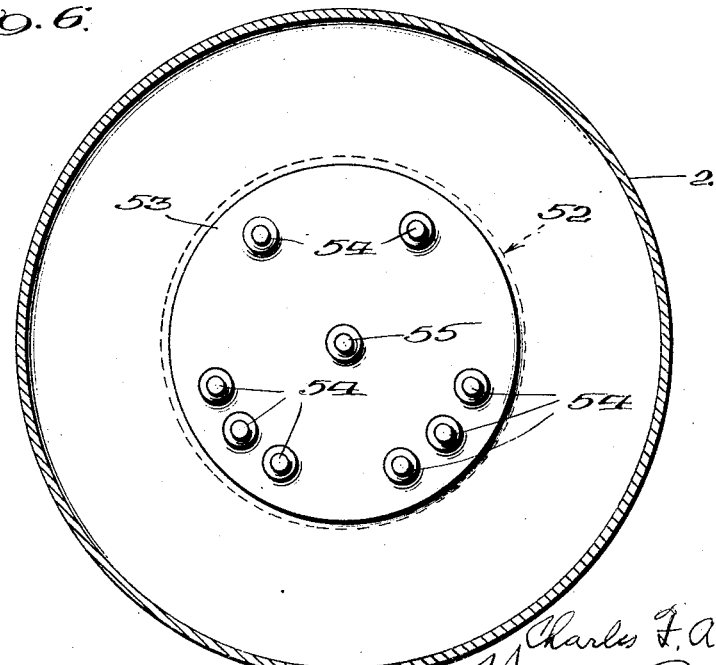

Figs. 5 and 6 are similar views respectively on the lines 5—5 and 6—6 of Fig. 2; and Fig. 7 is a detached perspective view of the contacts and panel carrying the same.

Referring to Fig. 1, a switch is shown mounted on the steering column of a motor vehicle, which steering column is designated generally by the numeral 1. The casing 2 of the switch is held in place by a suitable clamp 3 by which it is attached to the steering column.

An arm 4 extends outwardly from the steering column 1, being secured thereto by a clamp 5 of suitable construction and carrying at its outer end a quadrant 6, which may be of a construction similar to that shown in my prior Patent No. 1,689,118 of October 23, 1928, and which is provided with stop lugs at the opposite ends and with notches at suitable intervals for the purpose of receiving and holding the switch lever which is used to manipulate the switch. The lever is designated by the numeral 7 and has its inner end fixed to a shaft 8 journaled in the bracket 4. This shaft 8 is connected with the shaft 9 of the switch through a suitable universal joint, designated generally by the numeral 10.

The switch mechanism is shown as mounted some distance down on the steering column from the steering wheel, while the lever 7 is mounted immediately beneath or, if desired above the steering wheel, within convenient reach of the operator for manipulation, preferably without removing his hands from the steering wheel. However, if desired, the switch may be placed on the instrument board of the motor vehicle.

The casing 2 has a face-plate 11 fixed in the outer end thereof which may be of insulating material and is provided with a bearing 12 in the center thereof within which the shaft 9 is mounted. This shaft 9 may carry a pointer 13 for indicating the extent of manipulation of the switching mechanism.

Fixed within the casing 2 is a panel 14 preferably of insulating material and which is spaced from the face-plate 11, as shown in Fig. 2. This panel 14 also has a bushing 15 at the center thereof, within which the shaft 9 is journaled. The panel 14 is connected with the face-plate 11 through the bolts 16 for holding the parts in their proper positions.

As shown in Fig. 7, this panel 14 carries a series of contact and cam segments arranged in circular formation about the shaft 9. On one side and at the center, as shown in Fig. 4, is a cam segment 17, having a raised and curved upper surface 18. On opposite sides of the segments 17 are contact segments 19, 20, 21 and 22, the upper edges of which are lower than the extreme upper edge of the cam surface 18 and these segments are slightly spaced apart to be insulated from each other. Cam segments 23 and 24 are arranged at the edges of the contact segments 20 and 22. These segments 23 and 24 are of concave, convex formation, the convex portions being innermost and protruding inwardly slightly out of line with the inner surfaces of the contact segments 19, 20, 21 and 22. Those convex inner edges form cam surfaces 25 and 26.

Arranged opposite the cam segment 17 is a cam segment 27 which is also of generally concave, convex formation, the convex portion being innermost and forming a cam surface 28. Arranged on opposite sides of the cam segment 27 are contact segments 29 and 30, which are approximately in alignment with the edges of the cam segment 27, as also shown in Fig. 4. Extending from the outer edges of the segments 29 and 30 are cam segments 31 and 32, which have cam shaped upper edges 33 and 34 extending upwardly from the edges of the segments 29 and 30 to a height above that of those edges.

Connected with each of the contact and cam segments is a lug or bolt 35 which extends through the panel 14 and has a nut 36 secured thereto for holding these segments in place. Spring contacts 37, shown in Fig. 5 and in dotted lines in Fig. 4, are fixed to the lugs or bolts 35 connected with the segment 19, 20, 21, 22, 23, 24, 29 and 30. These spring contacts are held in place by nuts 38.

An arm 39 is fixed to the shaft 9 and extends in opposite directions from said shaft as shown in Fig. 4. This arm 39 may be of conducting material and is secured in contact with the shaft 9, being held in place against lateral displacement by a bushing 40 and washer 41, which are interposed between the arm 39 and the bushing 12, as shown in Fig. 2.

The opposite ends of the arm 39 have cylinders 42 therein within which contact pistons 43 are mounted, normally being pressed outward by springs 44 interposed between the ends of the pistons and of the cylinders. A guiding rod 45 is fixed to each of the pistons and is mounted in a recess 46, which extends inwardly from the cylinder 42.

The pistons 43 are designed to be forced outwardly and to bear against the contact segments for causing electrical contact therewith.

Each of the pistons 43 carries on its upper side a lug 47, which is mounted to slide in a notch 48 arranged above and communicating with the cylinder 42.

Arranged on opposite sides of the shaft 9 and immediately above the pistons 43 are locking springs 49 having their inner ends fixed to the arm 39 by set screws 50. These springs carry lugs 51 at their outer ends in position to hook over the lugs 47, to restrain the outward movement of the pistons 43, until released by the engagement of these lugs 51 with the cam surfaces 18, 33 and 34, which releases the pistons and allows the pistons to contact with the segments.

The casing 2 has a reduced portion 52 at its outer end in which a contact block 53 is mounted and carrying contact points 54 arranged about the center, as shown in Fig. 6, in position to engage the ends of the spring contacts 37.

These contact points 54 may be connected with suitable parts of corresponding front and rear direction indicators for automatic manipulation of the indicators when the proper circuits are closed.

A central contact point 55 is connected with a source of electrical supply and is adapted to extend into a recess 56 in the end of the shaft 9. Sleeved over the contact point 55 is a spring 57, the upper end of which abuts against the end of the recess 56. This spring 57 causes an electrical contact between the contact point 55 and the shaft 9.

In the manipulation of the switching mechanism, the lever 7 is moved back and forth across the quadrant 6 to turn the rod 8 and shaft 9 to cause a proper actuation of the switch. The lever 9 communicates with a source of electric current through the spring 57 and contact point 55 and establishes it to the arm 39 and the pistons 43 therein. When the arm 39 is in the position shown in Fig. 4, the pistons 43 contact with the cam segments 27 and 17. The cam surface 28 forces the piston 43 backward in one cylinder 42 sufficient for the lug to hook over the lug 47, restraining and preventing outward movement of the corresponding piston 43.

If that end of the arm 39 is moved in either direction by the proper rotation of the shaft 9, the restrained piston 43 will not contact with either of the contact segments 29 or 30, but when the corresponding lug 51 engages either of the cam surfaces 33 or 34 of the segments 31 or 33 respectively, this causes the corresponding lug 51 to ride up on the cam surface to disengage the lug 47 and release the piston 43, allowing this to contact with the segments 31 or 32 and 29 or 30, upon the return movement of the corresponding end of the arm 39.

The central position of the opposite end of the arm 39 disposes the corresponding lug 51 on the cam surface 18, raising it from hooked relation behind the lug 47 releasing the corresponding piston 43, allowing it to contact with the segment 17. As that end of the arm 39 is moved in either direction, the piston 43 will ride over the contact segments 19 and 20 or 21 and 22, and upon engaging the cam surface 25 or 26 will be forced back in the cylinder 42 causing the lug 51 carried by the lock-spring 49 to hook over the lug 47 and hold the piston in its retracted position in the cylinder 42. Upon the return of the corresponding end of the arm 39 to its central position, this piston 43 will be held in its retracted position out of contact with the segments, until the lug 51 rides over the cam surface 18 to release the piston.

During the movement of the arm in one direction from the center, the piston 43 rides over the segments 19 and 20 to close the proper electrical circuits for indicating the intention of the operator to turn in one direction, while the movement of this arm in the other direction indicates the opposite intention. It will be noted that during the movement of the pistons from the center outwardly, one of these pistons rides over the contacts 19 and 20 or 21 and 22, while the other piston is held in retracted position out of contact with the contacts 29 or 30. Upon the return movement to the center, this is reversed, the engagement with the latter contacts closing an electrical circuit to return the indicator to its normal position.

While the invention has been described in connection with a direction indicator for a motor vehicle, it is obvious that it may be used for other purposes or wherever it may be found suitable, and modifications within the spirit of the invention may be made to adapt it for such use.

I claim:

1. A switching mechanism including a contact segment, a longitudinally movable contact member adapted to engage said contact segment, means for sliding said contact member out of the path of the contact segment, and means for holding the contact member out of said path.

2. A switching mechanism including a contact segment, a longitudinally movable contact member adapted to be turned to engage said contact segment, a cam for longitudinally moving said contact member out of the path of the contact segment and means for holding the contact member in said retracted position.

3. A switching mechanism including a contact segment, a longitudinally movable contact member adapted to engage said contact segment, a cam for retracting the contact member out of the path of the contact segment, and means for holding said contact member in said retracted position.

4. A switching mechanism including a plurality of contact segments, a longitudinally movable contact member adapted to be turned to engage said contact segments, and a cam for causing a retraction of the contact member out of contact with the segments during movement along at least some of said segments.

5. A switching mechanism including a plurality of contact segments, a cam segment associated in longitudinal alignment therewith, and a longitudinally movable contact member adapted to be moved along and relative to the contact segments and to engage the cam segment to be retracted thereby out of the path of the contact segments.

6. A switching mechanism including a plurality of contact segments, a cam segment associated therewith, a longitudinally movable contact member adapted to be moved along and relative to the contact segments and to engage the cam segment to be retracted thereby out of the path of the contact segments, during at least a portion of the turning movement, and means for holding said contact member in the retracted position.

7. A switching mechanism including a plurality of contact segments, a cam segment associated therewith, a contact member adapted to be moved along and relative to the contact segments and to engage the cam segment to be retracted thereby out of the path of the contact segments, during at least a portion of the turning movement, means for holding said contact member in the retracted position, and means for automatically releasing said holding means and causing contacting engagement between the contact member and contact segments.

8. A switching mechanism including a support, a plurality of contact segments arranged in arcuate shape thereon, a cam segment arranged in alignment with said contact segments, and a longitudinally movable contact member adapted to be moved along and relative to the contact segments and to engage the cam segment to be retracted thereby.

9. A switching mechanism including a support, a plurality of contact segments arranged in arcuate shape thereon, a cam segment arranged in alignment with said contact segments, a contact member adapted to be moved along and relative to the contact segments and to engage the cam segment to be retracted thereby, means for holding said contact member in the retracted position, and a cam arranged in alignment with the contact segments and adapted to be engaged by said holding means to release the contact member.

10. A switching mechanism including a support, a plurality of contact segments arranged in approximately circular formation and carried by said support, cam segments arranged in alignment with said contact segments and having at least portions thereof extending inwardly out of alignment with the inner edges of the contact segments, and secondary cam segments arranged in alignment with the contact segments and having portions thereof extending upwardly out of alignment with the upper edges of the contact segments.

11. A switching mechanism including a support, a plurality of contact segments arranged in approximately circular formation and carried by said support, cam segments arranged in alignment with said contact segments and having at least portions thereof extending inwardly out of alignment with the inner edges of the contact segments, and secondary cam segments arranged in alignment with the contact segments and having portions thereof extending upwardly out of alignment with the upper edges of the contact segments, a contact member adapted to be moved relative to and in contact with contact segments to engage the first-mentioned cam segments to be retracted thereby out of contact with the contact segments, and means for holding said contact member in its retracted position, said last-mentioned means adapted to engage the secondary cam segments to cause a release of the contact member.

12. A switching mechanism including a movable shaft, a support mounted thereon and having a recess therein, a spring-pressed contact piston extending into said support, and means for holding the piston in a retracted position in the recess.

13. A switching mechanism including a movable shaft, a support connected therewith and having a recess therein, a piston extending into said recess, a spring normally tending to force the piston outwardly, and means for holding the piston in a retracted position in the recess.

14. A switching mechanism including a movable shaft, a support connected therewith and having a recess in the outer portion thereof, a piston extending into said recess, resilient means normally tending to move the piston outwardly, means for causing a retraction of the piston in the recess, and means for holding said piston in its retracted position.

15. A switching mechanism including a movable shaft, a support mounted thereon and having cylinders formed in outer portions thereof, pistons mounted in the cylinders, resilient means normally tending to force the pistons outward, pins connected with the pistons, means for causing a retraction of the pistons in the cylinders, and means resiliently supported by the support for engaging the pins to hold the pistons in their retracted positions.

16. A switching mechanism including a support, a plurality of contact segments carried by said support and having studs connected therewith and extending through the support, a plurality of radially extending spring contacts connected with the studs, and means carrying contact pins in position to engage said spring contacts.

17. A switching mechanism comprising a plurality of contacts, supporting studs for the contacts, a plurality of spring contacts carried by the studs, and contact pins arranged to engage said spring contacts.

18. A switching mechanism comprising a support, a plurality of contacts arranged on one side of the support, supporting studs for the contacts and extending through the support, spring contacts carried by the studs, and contact pins arranged to engage said spring contacts.

19. A switching mechanism comprising a contact segment, a longitudinally slidable contact member adapted to engage said contact segment, and means arranged in alignment with the contact segment for moving the contact member out of the path of the contact segment.

20. A switching mechanism comprising a contact segment, a longitudinally slidable contact member adapted to be moved in a path relative to said contact segment, and means arranged in alignment with the contact segment for moving said contact member out of said path of movement.

21. A switching mechanism comprising a contact segment, a longitudinally slidable contact member adapted to be moved in a path relative to said contact segment, and means arranged in longitudinal alignment with said contact segment for moving said contact member out of said path of movement for movement in the opposite direction out of contact with the contact segment.

22. A switching mechanism comprising a plurality of aligned contact segments, a longitudinally slidable contact member adapted to be moved in a path relative to said contact segments, and means arranged in longitudinal alignment with the aligned contact segments for moving the contact member out of the path of movement.

23. Switching mechanism comprising a contact segment, a rotatable support, a contact member carried by the support and longitudinally slidable radially thereof for engaging the contact segment, and means for holding said contact member in a retracted position.

24. Switching mechanism comprising a contact segment, a rotatable support, a contact member carried by the support and longitudinally slidable radially thereof for engaging the contact segment, means for retracting said contact member, and means for holding said contact member in a retracted position.

In testimony whereof I affix my signature.

CHARLES F. A. EDDY.